United States Patent [19]

Robbins

[11] 4,236,973
[45] Dec. 2, 1980

[54] METHOD OF REMOVING CONTAMINANTS FROM WATER

[75] Inventor: Lanny A. Robbins, Midland, Mich.

[73] Assignee: The Dow Chemical Company, Midland, Mich.

[21] Appl. No.: 39,073

[22] Filed: May 14, 1979

Related U.S. Application Data

[63] Continuation-in-part of Ser. No. 910,175, May 30, 1978, abandoned.

[51] Int. Cl.³ .............................................. C02B 1/04
[52] U.S. Cl. ..................................... 203/10; 203/34; 203/35; 203/41; 203/42; 203/49; 203/96
[58] Field of Search .................. 203/10, 11, 49, 92, 203/91, 90, 93, 95–97, 47, 34, 35, 36, 37, 41, 42; 202/202, 182; 210/63 R, 21

[56] References Cited

U.S. PATENT DOCUMENTS

| | | | |
|---|---|---|---|
| 1,836,563 | 12/1931 | Webster | 55/38 |
| 2,141,349 | 12/1938 | Engelhardt | 55/51 |
| 2,143,223 | 1/1939 | Heath | 423/503 |
| 2,527,444 | 10/1950 | Pape | 55/53 |
| 2,565,568 | 8/1951 | McCants | 203/47 |
| 2,773,003 | 12/1956 | Brown et al. | 208/370 |
| 2,927,075 | 3/1960 | Brown et al. | 208/208 R |
| 2,930,753 | 3/1960 | McMahon | 210/21 |
| 3,054,653 | 9/1962 | Barton et al. | 423/245 |
| 3,140,244 | 7/1964 | Simek et al. | 203/49 |
| 3,326,778 | 6/1967 | Mock | 203/49 |
| 3,475,282 | 10/1969 | Hamilton | 203/49 |
| 3,527,699 | 9/1970 | King | 210/21 |
| 3,617,209 | 11/1971 | Massone et al. | 203/46 |
| 3,876,508 | 4/1975 | Bonnema et al. | 203/35 |
| 3,884,650 | 5/1975 | Woerner et al. | 203/96 |
| 3,884,768 | 5/1975 | Griffith | 203/11 |
| 3,898,058 | 8/1975 | McGill | 55/50 |
| 3,931,001 | 1/1976 | Winn | 203/10 |
| 3,958,964 | 5/1976 | Koch | 55/38 |
| 4,066,514 | 1/1978 | Fowler | 203/11 |

OTHER PUBLICATIONS

"Air Stripping of Organics from Waste Water: A Compendium", L. S. Thibodeaux, Proc. 2nd Nat'l. Conf. on Complete Water, Chemical Abstracts 85:93800d.
Reuse: Water's Interface with Energy, Air & Solids AICHE, N.Y. (1975).
"Activity Coefficients & Molecular Structure", G. J. Pierotti et al., I & E Chemistry, vol. 51, No. 1, pp. 95 et seq. (Jan. 1959).
"Rates of Evaporation of Low Solubility Contaminants from Water Bodies to Atmosphere"; D. Makay et al., Environmental Science & Technology, vol. 7, No. 7, 611–614 (Jul. 1973).

*Primary Examiner*—Wilbur L. Bascomb, Jr.
*Attorney, Agent, or Firm*—J. M. Kuszaj; C. J. Enright

[57] ABSTRACT

Organic material having a normal boiling point in excess of 200° C. and a relative volatility with respect to water of at least one is removed from water contaminated therewith. The process comprises passing a current of vapor, sufficient to vaporize at least a portion of the organic material, through a moving stream of the contaminated water. In a preferred embodiment, the process comprises adjusting the pH of the contaminated water to a level sufficient to prevent substantial dissociation of the organic material. The contaminated water is then countercurrently contacted with a sufficient vapor flow to vaporize at least a portion of the organic material. The resulting organic material-containing vapor can be recovered, and the organic material removed. Illustrative of the process is the removal by air stripping of pentachlorophenol from waste water contaminated with about 250 parts per billion thereof.

42 Claims, 1 Drawing Figure

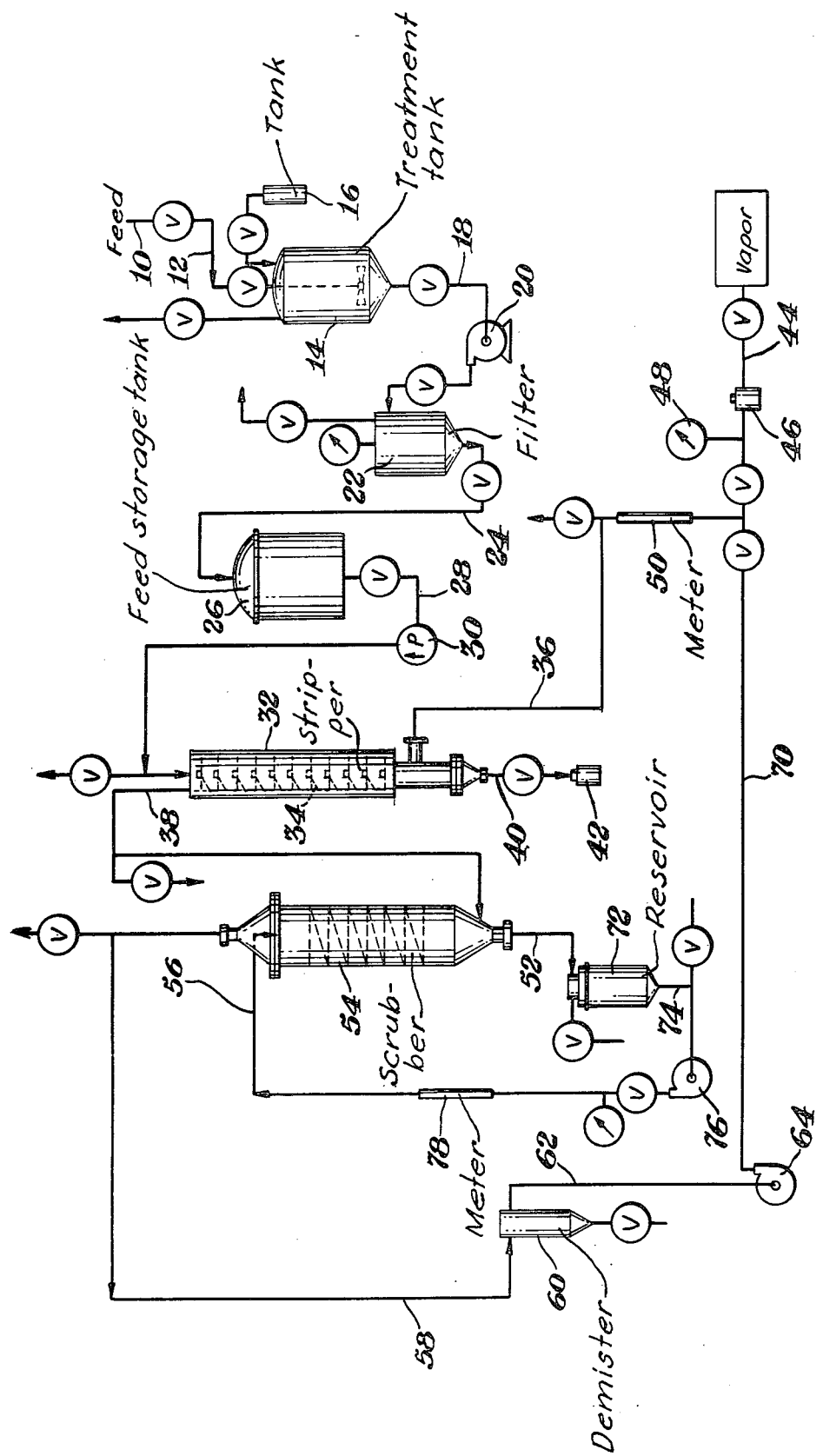

METHOD OF REMOVING CONTAMINANTS FROM WATER

REFERENCE TO RELATED APPLICATION

This is a continuation-in-part application to Applicant's pending application Ser. No. 910,175, filed May 30, 1978, and now abandoned.

BACKGROUND OF THE INVENTION

The present invention relates generally to water treatment, and more in particular to the removal of organic contaminants from water.

In the operation of many industrial processes, large quantities of effluent water are produced. Such water often contains organic materials dissolved therein as undesirable contaminants. Removal of these organic materials has posed a problem for industry, particularly when the objectionable organic materials have lower pure component vapor pressures and higher boiling points than water.

One approach to removing organic contaminants from water has been to vaporize and expel the volatile contaminants from the water by contacting the contaminants with a stripping vapor such as, for example, steam, natural gas, or air. Typical processes of the above types are taught, for example, in U.S. Pat. Nos. 2,141,349; 2,527,444; 2,773,003; 2,927,075; 2,930,753; and by L. J. Thibodeaux in "Air Stripping of Organics from Wastewater: A Compendium", proc. 2nd Nat'l. Conf. on Complete WateReuse: Water's Interface With Energy, Air, and Solids, AIChE, N.Y. (1975).

Contaminants that can be removed by such conventional processes are generally limited to low molecular weight compounds having higher pure component vapor pressures at 25° C. than water and lower normal boiling points than water (one atmosphere pressure). Such contaminants are known to be more volatile than water, and are expected form thermodynamic considerations to be readily desorbed into a stripping vapor.

A process employing air as the stripping vapor is discussed by Thibodeaux. Thibodeaux suggests that some organic contaminants which exhibit a lower pure component vapor pressure at 25° C. than water and a higher normal boiling point than water can be vaporized into an air stream if the activity coefficient of the contaminant in water is sufficiently large. However, an examination of the vapor-liquid equilibria data presented by Thibodeaux at page 362 demonstrates that even with large activity coefficients, organic contaminants having a normal boiling point in excess of 181.4° C. (Thibodeaux, Table 1), are not expected to be susceptible to vaporization be a stripping vapor due to their low relative volatilities.

However, in many applications, it is necessary to remove from water organic contaminants having lower pure component vapor pressures at 25° C. than water and having normal boiling points in excess of 200° C. It is thus desirble to develop a simple process for removing such contaminants from water which is effective, energy efficient, and economically attractive.

SUMMARY OF THE INVENTION

It has now been discovered that organic materials having a normal boiling point in excess of 200° C. and a relative volatility (hereinafter defined) with respect to water of at least one can be removed from water contaminated therewith by a stripping vapor.

The process comprises passing a current of vapor, sufficient to vaporize at least a portion of the organic material, through a moving stream of the contaminated water. In a preferred embodiment, the process comprises adjusting the pH of the contaminated water to a level sufficient to prevent substantial dissociation of the organic material. The contaminated water is then countercurrently contacted with a sufficient current of vapor to vaporize at least a portion of the organic material from the contaminated water and to transfer the organic material into the stripping vapor. The resulting organic material-containing vapor can be recovered, and the organic material removed.

The present method has a number of advantages over conventional processes. First, organic contaminants having lower pure component vapor pressures at 25° C. than water and higher normal boiling points than water are easily removed from water. Second, a low cost source of vapor, e.g., air, can be employed. Finally, contact between the aqueous phase being stripped and the medium used to absorb or adsorb the organic contaminant from the stripping vapor can be avoided.

BRIEF DESCRIPTION OF THE DRAWING

The single FIGURE shown in the drawing is a schematic representation of one embodiment of a system useful in practicing the present process.

DETAILED DESCRIPTION OF THE INVENTION

The water treated by the present process has generally been previously used in various chemical processing operations for purification or other purposes. When so used, the water becomes contaminated with dissolved products and by-products of the chemical process. The contaminants are generally dissolved in the water art, or below, their solubility limit.

Organic contaminants which can be removed from water by the present process have a normal boiling point (one atmosphere pressure) in excess of 200° C. and a relative volatility with respect to water of at least one. The instant compounds are considered to have a normal boiling point of more than 200° C. if their pure component vapor pressures are less than one atmosphere at 200° C. Preferably, the organic contaminants have a relative volatility with respect to water of at least about 4, and most preferably a relative volatility with respect to water of at least about 100. Suitable organic materials include, for example, pesticides, such as, aldrin, dieldrin, dichlorodiphenyltrichloroethane, heat transfer fluids, such as, biphenyl, o-chlorobiphenyl, 2,2'-dichlorobiphenyl, trichlorobiphenyl, diphenyloxide, o-chlorodiphenyloxide; antimicrobials, such as, pentachlorophenol; tetrachlorophenol, trichlorophenol, dichlorophenol; chlorobenzenes, such as, 1,2,4-trichlorobenzene, 1,2,3,4-tetrachlorobenzene, 1,2,4,5-tetrachlorobenzene; mixtures of the above and the like. Additional compounds wherein the relative volatility was determined experimentally, include 2,4-dichlorophenol; hexachlorobutadiene; 2-nitrophenol; hexachlorocyclopentadiene; 2,4,6-trichlorophenol; 2,4,5-trichlorophenol; 2,4-dinitrotoluene; pentachlorophenol; 2,2'-dichlorobiphenyl; hexachlorobenzene; anthracene; di-n-octyl phthalate; pyrene; benzo(a)pyrene; 0,0,-diethyl-O-3,5,6-trichloro-2-1-pyridyl phosphorothioate and mixtures thereof with each other and with members of the aforementioned group.

The process of the invention is adapted to remove a wide variety of classes of organic compounds from water. Members of these classes must also have a boiling point in excess of 200° C. and have relative volatilities with respect to water of at least one.

Tests indicate that chlorinated benzenes, such as hexachlorobenzene; chlorinated phenols such as pentachlorophenol; nitro-benzenes and alkyl nitro-benzenes such as 2,4-dinitrotoluene; chloroalkenes such as hexachlorobutadiene; chlorocycloalkenes such as hexachlorocyclopentadiene; polynuclear aromatics such as anthracene and benzo(a) pyrene; phthalate esters such as di-n-octyl phthalate; chloro-ethers, phosphate and phosphorothioate esters such as 0,0-diethyl-0,3,5,6-trichloro-2-pyridyl phosporothioate; chlorinated biphenyls such as 2,2'-dichlorobiphenyl; and mixtures thereof can be removed from water by the process of this invention.

Generally, the organic contaminants are present in the water in an amount of from about 5 to about 350 parts per billion (ppb). However, some processes may result in water containing more than 350 ppb of the organic contaminants. The removal of contaminants present in amounts in excess of 350 ppb is also within the scope of the present invention.

The relative volatility of an organic contaminant to water is defined by the thermodynamic derived equation:

$$\alpha_{cw} = \frac{K_c}{K_w} = \frac{y_c/y_w}{x_c/x_w} = \frac{\gamma_{cw} P^\circ_c}{\gamma_{ww} P^\circ_w} \quad (1)$$

where
$\alpha_{cw}$ = relative volatility of contaminant (c) to water (w)
K = vapor/liquid distribution coefficient
y = mole fraction in vapor phase at equilibrium
x = mole fraction in liquid phase at equilibrium
sub c = contaminant
sub w = water
$\gamma_{cw}$ = activity coefficient of contaminant in water
$\gamma_{ww}$ = activity coefficient of water
$P^\circ$ = pure component vapor pressure.

The relative volatility of the contaminant to water is a general indication of the ease of removing the contaminant from the water. A relative volatility greater than unity indicates that the contaminant is more volatile than water and will therefore desorb. The greater the magnitude of the relative volatility, the more easily the contaminant can be volatilized.

The relative volatility of any contaminant with respect to water can be calculated by first determining the solubility of the contaminant in water at a given temperature. This solubility can be determined by methods well known in the art, such as, by a "cloud point determination". For example, the solubility of pentachlorophenol in water at 100° C. had been determined to be 204 parts per million. Since the molecular weight of pentachlorophenol is 266.3, $x_c/x_w = (204 \times 10^{-6}) 18/266.3$.

The second step in calculating relative voltality involves determining the ratio of contaminant to water present in the vapor phase. This ratio may be obtained by methods well known in the art, such as by the use of azeotrophic data. For example, the vapor pressure of solid pentachlorophenol at 100° C. has been determined to be 0.0983 mm Hg. Since the vapor pressure of water at 100° C. is known to be 760 mm Hg, the ratio $y_c/y_w = 0.0983/760$. Substitution of the values obtained for $x_c/x_w$ and $y_c/y_w$ into Equation 1, yields a relative volatility of about 9.4. The experimental determination of the relative volatility for pentachlorophenol shown in Table III verified this result. Similar calculations can be made for other contaminants.

Other methods for estimating the relative volatility are available. See "Activity Coefficients and Molecular Structure:" (Pierotti et al.); *Industrial and Engineering Chemistry*, Vol. 51, No. 1 (Jan, 1959), p. 95. This article gives a method for estimating activity coefficients in water of high molecular weight organic compounds. The relative volatility is determined by equation (1) where the activity coefficient of the compound in water is $\gamma_{cw}$, and the activity coefficient of water, $\gamma_{ww}$, is equal to one.

In removing contaminants by a preferred embodiment of the present process, the pH of the water being treated in adjusted to a level sufficient to prevent substantial dissociation of the organic contaminant contained therein. By substantial dissociation, it is meant that more than about 10 percent of the organic contaminant has ionized in aqueous solution. Preferably, the pH of the water being treated in maintained at a level sufficient to prevent more than about 1 percent of the organic contaminant from ionizing. Normally, when the organic contaminant is an acidic material, the pH of the water is maintained at a level lower than the $pK_a$ of the acidic material. For example, when pentachlorophenol is the contaminant, its $pK_a$ at 25° C. is 4.8. Consequently, the pH of the water is maintained at less than 4.8, e.g., about 3.0. The pH can be controlled by introducing sufficient amounts of suitable mineral acids, such as, for example HCl, $H_2SO_4$, $HNO_3$, mixtures thereof, and the like. When the organic contaminant is a basic material, the pH of the water should be maintained at a level greater than the $pK_a$ of the basic material. The pH control can be accomplished by adding sufficient amounts of a suitable base, such as, for example, NaOH, KOH, mixtures thereof, and the like.

Many organic compounds do not appreciably dissociate in water. A wide range of pH levels are sufficient to prevent substantial dissociation of these compounds. Any of these pH's would be sufficient to prevent dissociation and therefore are considered within the scope of this invention.

The $pK_a$ can be determined by a simple test well known to those skilled in the art. Often such values are known and published in the literature. To determine the $pK_a$ when a published value is not available, one can refer to published test methods to determine the $pK_a$, for example, in *Archives of Biochemistry and Biophysics*, Vol. 54, pg. 55-71, G. E. Blackman, M. H. Parke, and G. Garton (1955).

Following any necessary pH adjustment, a current of vapor, sufficient to vaporize at least a portion of the organic material, is passed through a moving stream of the contaminated water.

Any vapor which is chemically nonreactive with both the water and the organic contaminant can be employed. The term "vapor" is meant to include any material that is in the vapor phase at the temperature of operation, including materials which are commonly gases at that temperature. Suitable vapors include, for example, carbon dioxide, carbon monoxide, helium, methane, nitrogen, oxygen, air, steam, mixtures thereof, and the like. In one embodiment, substantially only atmospheric air is used as the stripping vapor. In another embodiment, substantially only steam is used as the stripping vapor. The vapor used can contain water, it can be anhydrous, or it can be saturated with water vapor at the temperature of operation. In one embodiment, it is preferred that a vapor, such as air, be saturated with water vapor to avoid the necessity of expending energy to vaporize water to reach the saturation point of water in the air.

The volume ratio of vapor to water being treated should be as small as possible, in order to minimize equipment size. A vapor to water ratio of from about one to about 1,500 cubic feet (cf) of vapor per gallon of water has been found to be satisfactory in most applications at 25° C. However, ratios in excess of 1,500 cf/gal can be used if desired.

The vapor to water ratio for stripping contaminants from water has been found to be a function of the relative volatility of the contaminant to water. The larger the relative volatility, the less vapor that is required to effect separation. Consequently, organic contaminants with high relative volatilities are preferred in the practice of the process.

The vapor and water can be contacted in any suitable apparatus which insures effective contact between the vapor and the contaminated water. Contact of the vapor and the water is preferably accomplished in countercurrent flow so as to assure efficient operation and adequate contact between the liquid and the vapor. However, other forms of liquid-vapor contacting methods which are well known in the art may be utilized.

The vapor/water contacting is normally conducted at about atmospheric pressure and at a temperature of from about 5° C. to about 100° C. For all vapor, with the obvious exception of steam, a temperature of from about 15° C. to about 25° C. is preferred for economic reasons. However, the process can be operated at other pressures and at temperatures from about the freezing point of the contaminated water to about, or slightly above, the boiling point of the contaminated water, if desired.

Subsequent to its removal from the water stream, the organic material-containing vapor can be recovered from the stripping column and the organic material removed from the vapor. The removal can be effected by well-known techniques such as, for example, absorption, extractive distillation, adsorption, combustion, or condensation followed by phase separation. For example, when pentachlorophenol is removed from water by the use of air, the resulting pentachlorophenol-ladened air can be contacted in a liquid scrubber with a caustic stream, such as 1% by weight NaOH, to absorb the pentachlorophenol. When pentachlorophenol is removed from water by the use of steam the resulting pentachlorophenol-ladened steam can be condensed, and the resulting pentachlorophenol fraction separated by filtration. Vapor (e.g., air) which has been depleted of organic contaminants can be recycled and again passed through a second body of contaminated water to strip the contaminant therefrom as described previously. Vapor which has been condensed (e.g. steam) and at least partially depleted of organic contaminants can be mixed with the initial contaminated water stream and again subjected to steam stripping.

The detailed operation of one embodiment of the present process, wherein the stripping vapor is air, is further described by referring to the drawing. In the illustrated embodiment, a stream of water contaminated with an organic contaminant, is introduced into the system through conduit 10. The contaminated water passes via conduit 12 into treatment tank 14 where the pH of the contaminated water can be adjusted by the addition of acidic or basic medium from tank 16. The contaminated water stream then passes via conduit 18 and pump 20 into filter 22, wherein solid pollutants are removed from the water stream. The filtered water is transferred via conduit 24 to feed storage tank 26. The contaminated water is then withdrawn from feed storage tank 26, and introduced via conduit 28 and pump 30 into the upper portion of stripping column 32.

The stripping column 32, contains a plurality of plates and downcomers 34 in the interior thereof. A current of vapor enters the lower portion of the stripping column 32 via conduit 36. The vapor is passed from a source into the system through conduit 44. Regulator 46, pressure indicator 48, and rotometer 50 measure and control the flow of vapor.

The contaminated water descends through column 32 and plates and downcomers 34 and is countercurrently contacted with the current of vapor. The stripping vapor and the organic contaminants vaporized therein are discharged from the upper portion of the column 32 via conduit 38. Water stripped of its contaminants is discharged from stripping column 32 through conduit 40 and optionally retained in vessel 42.

The stripping vapor and organic contaminants contained therein can be passed via conduit 38 into the lower portion of scrubber 54. Alternatively, if the stripping vapor is an easily condensable material, such as steam, the stripping vapor and organic contaminants contained therein can be passed via conduit 38 to a suitable condensor (not shown), instead of scrubber 54.

In scrubber 54, the vapor and contaminants contained therein ascend through suitable packing material, and are countercurrently contacted with a stream of caustic, or other material which preferentially absorbs the contaminant and removes it from the vapor. The caustic or other absorbent enters the upper portion of scrubber 54 via conduit 56.

Vapor that has passed through scrubber 54 or a suitable condenser is discharged via conduit 58 and optionally (in the case of air) recycled via conduit 58 to demister 60. Vapor from demister 60 is passed via conduit 62 to pump 64. Recycled vapor is then transported through conduit 70 and rejoins the incoming vapor at regulator 50.

A reservoir of caustic or other scrubbing material is contained in reservoir 72. This caustic or other absorbent is passed via conduit 74, pump 76, and meter 78 into the upper portion of the scrubber 54 via conduit 56. The at least partially spent absorbent is discharged from the scrubber 54 via conduit 52.

In an alternative embodiment, the scrubber 54 represents one of a number of alternative methods for removing the contaminant from the vapor. Scrubber 54 can represent a carbon bed adsorption apparatus, a condenser and phase separator, combustion apparatus, or extractive distillation apparatus.

The invention is further described by the following examples:

Examples 1–21

Using an apparatus substantially identical to that described in the drawing, a waste water stream containing pentachlorophenol was treated by the present process. A 100 millimeter (mm) outside diameter Oldershaw column was employed as the stripping column. The Oldershaw column contained 10 sieve plates and downcomers. A 4-inch inside diameter column, 36 inches in length and packed with 18 inches of ¼ inch Berl saddles was employed as the caustic scrubber.

The waste water stream was contaminated with 240 parts per billion of pentachlorophenol. The water was acidified by the addition of sulfuric acid until a pH of about two was achieved and then fed near the top of the stripping column at a flow rate of about one pound per hour.

Dry atmospheric air was introduced near the bottom of the column at a rate of 2.4 cubic feet per minute and was vented from the top of the column.

The pentachlorophenol in the effluent water or bottoms was reduced from 240 ppb to 2.4 ppb for a 99% removal. The volume of stripping air as well as weight of stripped water was measured and is shown in Table I, Example 1.

Examples 2–9

Water was treated substantially as described in Example 1. However, the air exiting from the top of the stripper was conducted to a scrubber and passed upwardly through the caustic scrubber where it was contacted with a countercurrent flow of a one percent by weight sodium hydroxide solution. Air exiting the caustic scrubber was recirculated to the stripper column in a completely enclosed vapor circuit. The air entering the stripper was recirculated and scrubbed (Rec/-Scrubbed). Various operational parameters were varied as indicated in Table I, Examples 2–9.

Examples 10–15

Water was treated substantially as described in Example 1. However, the air entering the stripping column was saturated with water vapor (air/Sat'd H₂O). This prevents cooling of the air and water by evaporation. Various operational parameters were varied as indicated in Table I, Examples 10–15.

Examples 16–21

Water was treated substantially as described in Example 1. The various operational parameters were varied as indicated in Table I, Examples 16–21.

TABLE I

| | | | | Contaminant:Pentachlorophenol; B. P. 309° C. | | |
|---|---|---|---|---|---|---|
| Example No. | Water lbs/hr | Air CFM | Stripping Air | ppb Contaminant | | |
| | | | | Feed | Bottoms | % Removal |
| 1 | 1.0 | 2.4 | Dry/Ambient | 240 | 2.4 | 99.0 |
| 2 | 1.0 | 2.4 | Recycled/Scrubbed | 240 | 3.5 | 98.5 |
| 3 | 1.0 | 2.4 | " | 240 | 1.0 | 99.6 |
| 4 | 1.0 | 1.83 | " | 240 | 12.0 | 95.0 |
| 5 | 1.0 | 1.83 | " | 240 | 12.0 | 95.0 |
| 6 | 1.0 | 1.13 | " | 240 | 20.0 | 91.7 |
| 7 | 1.0 | 1.13 | " | 240 | 22.0 | 90.8 |
| 8 | 0.65 | 1.45 | " | 8700 | 130 | 98.5 |
| 9 | 1.0 | 2.45 | " | 8700 | 600 | 93.1 |
| 10 | 4.0 | 3.0 | Saturated w/water | 246 | 89 | 63.8 |
| 11 | 4.0 | 3.0 | " | 246 | 118 | 52.0 |
| 12 | 2.0 | 1.5 | " | 246 | 65 | 73.6 |
| 13 | 2.0 | 1.5 | " | 246 | 96 | 60.9 |
| 14 | 1.0 | 1.5 | " | 246 | 12 | 95.1 |
| 15 | 1.0 | 1.5 | " | 246 | 21 | 91.5 |
| 16 | 3.96 | 2.99 | Dry/Ambient | 210 | 104 | 50.5 |
| 17 | 3.96 | 2.99 | " | 210 | 136 | 35.2 |
| 18 | 2.16 | 1.51 | " | 210 | 168 | 20.0 |
| 19 | 2.16 | 1.51 | " | 210 | 163 | 22.3 |
| 20 | 1.0 | 1.51 | " | 210 | 153 | 27.1 |
| 21 | 1.0 | 1.51 | " | 210 | 146 | 30.4 |

Examples 22–27

Using apparatus similar to that described in the drawing, water containing 220 ppb pentachlorophenol was treated by the present process. The feed was acidified with mineral acid to a pH of 2.15 prior to stripping. In this example and the others reported in Table II, the stripping vapor was steam.

The equipment consisted of a two gallon still pot, a two inch diameter, twenty-five plate, glass Oldershaw column, a feed preheater, a water cooled overhead condenser and bottoms and overhead receivers.

The feed water was preheated to approximately 90 degrees Celsius, and fed to the top of the stripping column. The water then flowed down through the stripping column and into the still pot. The still pot was heated to generate steam which rose through the column countercurrently to the water, stripped the organic compound and then was condensed by the condenser into the overhead receiver. The boil up rate listed in the table is the percentage of the water feed stream that is taken as condensate into the overhead receiver. The remaining bottoms or stripped water stream was withdrawn from the still pot into the bottoms receiver and analyzed for the organic contaminant.

The contaminants removed and the operational parameters are shown in Table II, Examples 22–27.

Example 28a–d

A process effluent stream containing a mixture of chlorophenols was stripped by a procedure similar to that in Examples 22–27. The feed was acidified to a pH of two and filtered prior to stripping. The results and process parameters are shown in Table II. The bottoms and overhead concentrations shown are averages of three separate runs.

Examples 29 and 30

Waters containing diphenyl oxide and trichlorobenzene were stripped by a process similar to that described in Example 22. The parameters of the process are indicated in Table II.

TABLE II

| Example No. | Contaminant | B.P. °C. | Feed Rate lbs/hr | Overhead % of Feed | ppb Contaminant | | % Removed |
|---|---|---|---|---|---|---|---|
| | | | | | Bottoms | Overhead | |
| 22 | pentachlorophenol | 309 | 10.0 | 9.9 | 220 | 9.0 | 2,165 | 95.9 |
| 23 | " | " | 10.0 | 10.5 | 220 | 9.3 | 2,200 | 95.8 |
| 24 | " | " | 10.0 | 11.0 | 220 | 6.8 | 2,075 | 96.9 |
| 25 | " | " | 10.0 | 23.0 | 220 | 1.3 | 1,040 | 99.4 |
| 26 | " | " | 9.8 | 21.0 | 220 | 1.2 | 990 | 99.5 |
| 27 | " | " | 10.0 | 23.0 | 220 | 1.2 | 990 | 99.5 |
| 28a | Dichlorophenols | 210/220 | 10.0 | 20.0 | 46,500 | <1000 | 226,700 | >97.8 |
| 28b | Trichlorophenols | 246/252 | 10.0 | 20.0 | 3,820 | 19.5 | 16,500 | 99.5 |
| 28c | Tetrachlorophenols | 275 | 10.0 | 20.0 | 2,280 | 49.5 | 7,420 | 97.8 |
| 28d | Pentachlorophenol | 309 | 10.0 | 20.0 | 2,040 | 27.2 | 7,200 | 98.7 |
| 29 | Diphenyloxide | 259 | 10.0 | 10.0 | 4,700 | <20 | — | >99.6 |
| 30 | Trichlorobenzene | 213 | 10.0 | 10.0 | 480 | 0.17 | — | 99.9 |

Lab Tests No. 1-15

These tests demonstrate a quick and easy batch differential distillation method for obtaining the relative volatility ($\alpha$) for compounds for which a published value is not available. In these examples, the relative volatility is experimentally determined for 14 compounds. The results, i.e. that the relative volatility is greater than one, indicate that each compound may be stripped from water according to the practice of the present invention.

The organic compound to be tested is dissolved in water to a concentration less than its solubility limit. The solution (FEED) is then slowly heated at atmospheric pressure to boiling in a flask. Heating is continued until approximately one percent of the feed is evaporated. The vapor is conducted from the flask to a condenser and receiver. The vapor line is heated to prevent any condensation of the vapor before it reaches the condenser. After the approximately one percent is vaporized, the heat is removed and the water remaining in the flask (BOTTOMS) and the condensed vapor (OVERHEAD) are analyzed for the organic compound.

The relative volatility ($\alpha$) can be calculated from the concentrations found using the following equation which gives the relation of relative volatility to measured concentrations in batch differential distillation experiments such as the one described above.

$$\alpha = \frac{\ln\left(1 + \frac{V}{L}\frac{y_i}{x_i}\right)}{\ln\left(1 + \frac{V}{L}\frac{y_w}{x_w}\right)} \quad (2)$$

Where:
$\alpha$ = relative volatility of impurity to water.
V = moles of vapor to overhead condensate.
L = moles of liquid remaining in bottoms.
$y_i$ = mole fraction of impurity in overhead.
$x_i$ = mole fraction of impurity in bottoms.
$y_w$ = mole fraction of water in overhead.
$x_w$ = mole fraction of water in bottoms.

Note tht the relative volatility is a function of the concentration of the impurity in the bottoms and overhead. Therefore, the discrepancy in weight recovery of the impurity is not significant.

TABLE III

| Test No. | Compound | B.P. °C. | pH | ppb Compound | | | Recovery | $\alpha$ |
|---|---|---|---|---|---|---|---|---|
| | | | | Feed | Bottoms | Overhead | | |
| 1 | 2,4-dichlorophenol | 209 | 5.8 | 570,000 | 460,000 | 5,160,000 | 89 | 10.7 |
| 2 | hexachlorobutadiene | 214 | N/A | 222 | 56 | 4,195 | 46 | 54 |
| 3 | 2-nitrophenol | 214 | 5.0 | 162,000 | 137,000 | 2,075,000 | 98 | 14 |
| 4 | hexachlorocyclopentadiene | 234 | N/A | 160 | 35 | 4,720 | 53 | 84 |
| 5 | 2,4,6-trichlorophenol | 246 | 4.1 | 123,000 | 83,000 | 1,215,000 | 77 | 13.8 |
| 6 | 2,4,5-trichlorophenol | 252 | 5.0 | 134,000 | 106,000 | 1,245,000 | 87 | 11.2 |
| 7 | 2,4-dinitrotoluene | 300 | N/A | 19,700 | 17,950 | 47,240 | 93 | 2.6 |
| 8 | pentachlorophenol | 309 | 3.0 | 1,230 | 950 | 9,340 | 84 | 9.4 |
| 9 | 2,2'-dichlorobiphenyl | 317 | N/A | 57 | 18 | 1,230 | 55 | 51 |
| 10 | hexachlorobenzene | 326 | N/A | 0.7 | 0.1 | 25.6 | 60 | 118 |
| 11 | anthracene | 342 | N/A | 4.44 | 1.35 | 105 | 60 | 57 |
| 12 | di-n-octyl phthalate | 385 | N/A | 5,000 | 1,690 | 50,710 | 45 | 26 |
| 13 | pyrene | 404 | N/A | 13 | 6.6 | 184 | 77 | 24 |
| 14 | benzo (a) pyrene | 495 | N/A | .28 | .23 | 1.35 | 97 | 5.7 |
| 15 | O,O-diethyl 0-3,5,6-trichloro-2-pyridyl phosphorothioate | * | N/A | 13 | 4.2 | 290 | 55 | 54 |

*The vapor pressure of this compound is less than one atmosphere at 200° C.

What is claimed is:
1. A process for removing at least one organic material selected from the group consisting essentially of chlorinated phenols, phthalate esters, phosphate esters, phosphorothioate esters, chlorinated benzenes, chlorinated biphenyls, polynuclear aromatics, nitrobenzenes, alkyl nitrobenzenes, chloroalkenes, chlorocycloalkenes and chloro-ethers from water contaminated therewith, said organic material having a normal boiling point in excess of 200° C. and a relative volatility with respect to water of at least about one; said process comprising passing a current of vapor, sufficient to vaporize at least a portion of said organic material, through a moving stream of said contaminated water; and then separating vapor containing the organic material from the water to produce water having a reduced concentration of the organic material.

2. The process of claim 1 wherein the pH of said contaminated water is adjusted to a level to prevent substantial dissociation of said organic material.

3. The process of claim 1 wherein the pH of the contaminated water is maintained at a level less than the pH corresponding to the $pK_a$ of the organic material.

4. The process of claim 1 wherein the contacting is conducted at a temperature of from about 5° to about 100° C.

5. The process of claim 1 wherein the contaminated water is contacted with vapor in a ratio of from about 1 to about 1,500 cubic feet of vapor per gallon of water.

6. The process of claim 1 wherein the vapor passing through the contaminated water is saturated with water vapor.

7. The process of claim 1 wherein the organic material is present in an amount of from about 5 to about 350 parts per billion in the contaminated water.

8. The process of claim 1 wherein the vapor is selected from the group consisting of carbon dioxide, carbon monoxide, helium, methane, nitrogen, oxygen, steam, air and mixtures thereof.

9. The process of claim 1 wherein the vapor is atmospheric air.

10. The process of claim 1 wherein the vapor is steam.

11. The process of claim 1 wherein the relative volatility is at least four.

12. The process of claim 1 wherein the relative volatility is at least 100.

13. The process of claim 1 or claim 2 wherein the organic material is selected from the group consisting of aldrin; dieldrin; dichlorodiphenyltrichloroethane; O,O-diethyl-O-3,5,6-trichloro-2-pyridyl phosphorothioate; biphenyl, o-chlorobiphenyl; 2,2'-dichlorobiphenyl; trichlorobiphenyl; diphenyloxide; o-chlorodiphenyloxide; 1,2,4-trichlorobenzene; 1,2,3,4-tetrachlorobenzene; 1,2,4,5-tetrachlorobenzene, 2,4-dichlorophenol; 2,6-dichlorophenol; 2,4,6-trichlorophenol; 2,4,5-trichlorophenol; 2,3,4,5-tetrachlorophenol; 2,3,4,6-tetrachlorophenol; pentachlorophenol; hexachlorobutadiene; 2-nitrophenol; hexachlorocyclopentadien; 2,4-dinitrotoluene; 2,2'-dichlorobiphenyl; hexachlorobenzene; anthracene; di-n-octyl phthalate; pyrene; benzo-(a)-pyrene, and mixtures thereof.

14. The process of claim 2 wherein the organic material is selected from the group consisting of pentachlorophenol, tetrachlorophenol, trichlorophenol, dichlorophenol, and mixtures thereof.

15. The process of claim 2 wherein the organic material is pentachlorophenol.

16. The process of claim 1 wherein the organic material is a phosphorothioate ester.

17. The process of claim 1 wherein the organic material is O,O-diethyl-O-3,5,6-trichloro-2-pyridyl phosphorothioate.

18. The process of claim 1 wherein the organic material is a phthalate ester.

19. The process of claim 1 wherein the organic material is di-n-octyl phthalate.

20. The process of claim 1 including the additional steps of:
recovering the organic material-containing vapor; and
removing said organic material from said vapor.

21. The process of claim 20 including recycling the vapor through the contaminated water after removing the organic material from the vapor.

22. The process of claim 20 wherein the organic material is removed from the vapor by contacting said vapor with a suitable material to preferentially adsorb said organic material.

23. The process of claim 20 wherein the organic material is removed from the vapor by contacting said vapor with a suitable material to preferentially absorb said organic material.

24. The process of claim 20 wherein the organic material is removed from the vapor by combustion.

25. The process of claim 20 wherein the organic material is removed from the vapor by condensation followed by phase separation.

26. The process of claim 1 wherein sufficient vapor is passed through the moving stream to reduce the concentration of the organic material in the water to less than 1000 parts per billion.

27. The process of claim 1 wherein the contaminated water through which the vapor passes contains up to 46,500 parts per billion of the organic material.

28. The process of claim 1 wherein the organic material is at least one member selected from the group consisting of chlorinated phenols, phthalate esters, phosphorothioate esters, chlorinated benzenes, chlorinated biphenyls, polynuclear aromatics and nitrobenzenes.

29. A process for removing pentachlorophenol from water contaminated therewith comprising:
(a) adding sufficient mineral acid to said contaminated water stream to maintain a pH of less than about 3;
(b) passing a current of vapor, sufficient to vaporize at least a portion of said pentachlorophenol, through a moving stream of said contaminated water; and
(c) recovering the resulting pentachlorophenol-containing vapor.

30. The process of claim 29 wherein the vapor is air.

31. The process of claim 30 including the additional step of:
contacting said pentachlorophenol containing air with an absorbent to preferentially remove said pentachlorophenol.

32. The process of claim 31 wherein the absorbent is an aqueous solution of sodium hydroxide.

33. The process of claim 29 wherein the vapor is steam.

34. The process of claim 33 including the additional steps of:
(d) condensing said pentachlorophenol containing steam; and
(e) separating the resulting condensed steam fraction from the resulting condensed pentachlorophenol fraction.

35. A process for removing organic material from water contaminated therewith, said organic material having a normal boiling point in excess of 200° C. and a relative volatility with respect to water of at least about one; said process comprising pasing a current of vapor, sufficient to vaporize at least a portion of said organic material and to reduce the concentration of the organic material to less than 1,000 parts per billion, through a moving stream of said contaminated water.

36. The process of claim 35 wherein the contaminated water through which the vapor passes contains up to 46,500 parts per billion of the organic material.

37. The process of claim 36 wherein the contaminated water is contacted with a vapor in a ratio of from about 1 to about 1,500 cubic feet of vapor per gallon of water.

38. The process of claims 36 or 37 wherein the vapor is steam.

39. A process for removing at least one organic material selected from the group consisting essentially of chlorinated phenols, phthalate esters, phosphate esters, phosphorothioate esters, chlorinated benzenes, chlorinated biphenyls, polynuclear aromatics, nitrobenzenes, alkyl nitrobenzenes, chloroalkenes, chlorocycloalkenes, and chloro-ethers from water contaminated with up to 46,500 parts per billion therewith, said organic material having a normal boiling point in excess of 200° C. and a relative volatility with respect to water of at least about one; said process comprising passing a current of vapor, sufficient to vaporize at least a portion of said organic material and to reduce the concentration of the organic material to less than 1,000 parts per billion, through a moving stream of said contaminated water; and then separating vapor containing the organic material to produce water containing less than 1,000 parts per billion of the organic material.

40. The process of claim 39 wherein the vapor is steam.

41. The process of claim 39 including passing the vapor in countercurrent flow through a downwardly moving stream of the contaminated water.

42. The process of claim 39 wherein the organic material is at least one member selected from the group consisting of chlorinated phenols, phthalate esters, phosphorothioate esters, chlorinated benzenes, chlorinated biphenyls, polynuclear aromatics and nitrobenzenes.

* * * * *

UNITED STATES PATENT AND TRADEMARK OFFICE
CERTIFICATE OF CORRECTION

PATENT NO. : 4,236,973

DATED : December 2, 1980

INVENTOR(S) : Lanny A. Robbins

It is certified that error appears in the above—identified patent and that said Letters Patent is hereby corrected as shown below:

Col. 1, line 40, delete "form" and insert --from--.

Col. 1, line 55, delete "be" and insert --by--.

Col. 1, line 61, delete "desirble" and insert --desirable--.

Col. 2, line 40, delete "art" and insert --at--.

Col. 2, line 68, delete "3,5,6-trichloro-2-1-pyridyl" and insert --3,5,6-trichloro-2-pyridyl--.

Col. 3, line 54, delete "determing" and insert --determining--.

Col. 3, line 63, delete "voltality" and insert --volatility--.

Col. 3, line 67, delete "azeotrophic" and insert --azeotropic--.

Col. 4, line 7, delete "verified" and insert --verifies--.

Col. 4, line 21, delete "in" and insert --is--.

UNITED STATES PATENT AND TRADEMARK OFFICE
CERTIFICATE OF CORRECTION

PATENT NO. : 4,236,973
DATED : December 2, 1980
INVENTOR(S) : Lanny A. Robbins

It is certified that error appears in the above—identified patent and that said Letters Patent is hereby corrected as shown below:

Col. 4, line 26, delete "in" and insert --is--.

Col. 5, line 56, insert a comma --,-- after the word "steam".

Col. 6, line 36, delete "condensor" and insert --condenser--.

Col. 9 and 10, Table II, in the heading of Col. 5, move the words "Over-head % of" to the left so that they are directly above the word "Feed".

Col. 10, line 37, delete "tht" and insert --that--.

Col. 13, line 1, delete "pasing" and insert --passing--.

Signed and Sealed this

Tenth Day of March 1981

[SEAL]

Attest:

RENE D. TEGTMEYER

Attesting Officer

Acting Commissioner of Patents and Trademarks